United States Patent [19]
Sutterlin

[11] Patent Number: 5,197,066
[45] Date of Patent: Mar. 23, 1993

[54] COLLISION DETECTION CIRCUIT FOR COMMUNICATIONS NETWORK

[76] Inventor: Philip H. Sutterlin, 1103 Happy Valley Ave., San Jose, Calif. 95129

[21] Appl. No.: 678,524

[22] Filed: Mar. 28, 1991

[51] Int. Cl.[5] ............................................. H04J 3/02
[52] U.S. Cl. .................................. 370/85.3; 370/85.1
[58] Field of Search ................... 370/85.3, 85.1, 110.1, 370/85.2, 67, 93; 379/93; 358/190; 340/825.5, 825.51; 455/79, 80, 81, 83, 123, 125; 333/109, 117; 343/703; 324/98, 108

[56] References Cited

U.S. PATENT DOCUMENTS

| | | | |
|---|---|---|---|
| Re. 31,638 | 7/1984 | Lam | 379/93 |
| 3,983,323 | 9/1976 | Griffith et al. | 379/93 |
| 4,187,535 | 2/1980 | Wigley et al. | 358/190 |
| 4,610,010 | 9/1986 | Claessen et al. | 370/85.2 |
| 4,636,584 | 1/1987 | Binkerd et al. | 370/110.1 |
| 4,642,607 | 2/1987 | Strom et al. | 340/825.5 |
| 4,642,805 | 2/1987 | Dumas et al. | 370/58 |
| 4,766,402 | 8/1988 | Grane | 379/93 |
| 4,797,901 | 1/1989 | Goerne et al. | 340/825.5 |

Primary Examiner—Douglas W. Olms
Assistant Examiner—Shick Hom

[57] ABSTRACT

A collision detection circuit which indicates to a processing node, while the node is transmitting, that another transmission has, or is occurring, on the network comprises a means for directionally coupling a processing node to the network to discriminate between the outgoing power associated with a first message packet and the incoming power associated with a second message packet. A sensing means receives the incoming power from the directional coupling means during the transmission of the first message packet and indicates that a collision is occurring between the two transmissions. The directional coupling means comprises a cross-coupled voltage divider network configured such that a nulled voltage is generated at a pair of collision detection ports in response to the outgoing transmission, whereas a differential voltage is produced across the collision detection ports whenever an incoming colliding transmission appears.

23 Claims, 7 Drawing Sheets

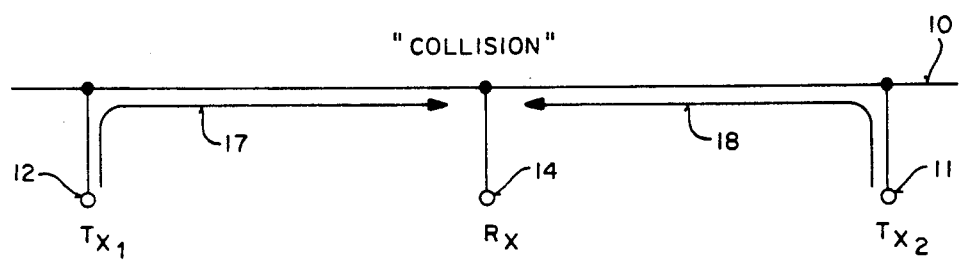
FIG_1 (PRIOR ART)
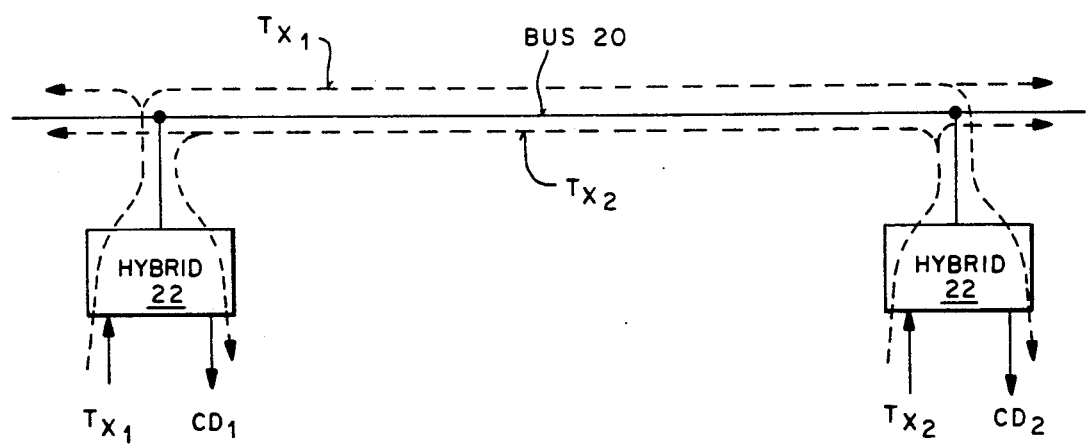
FIG_2

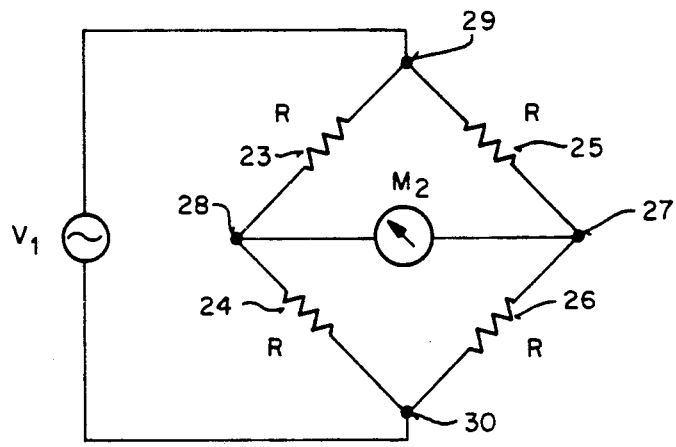
FIG_3A
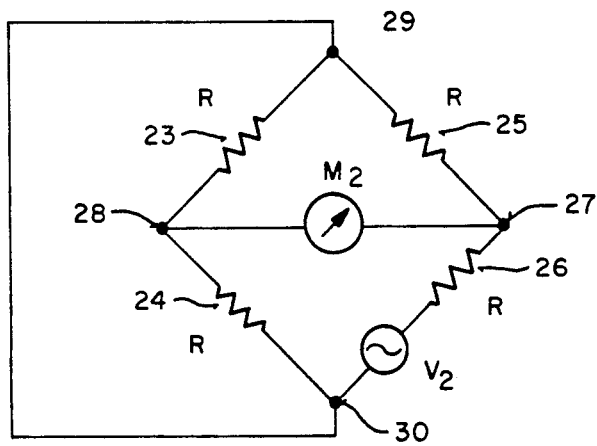
FIG_3B
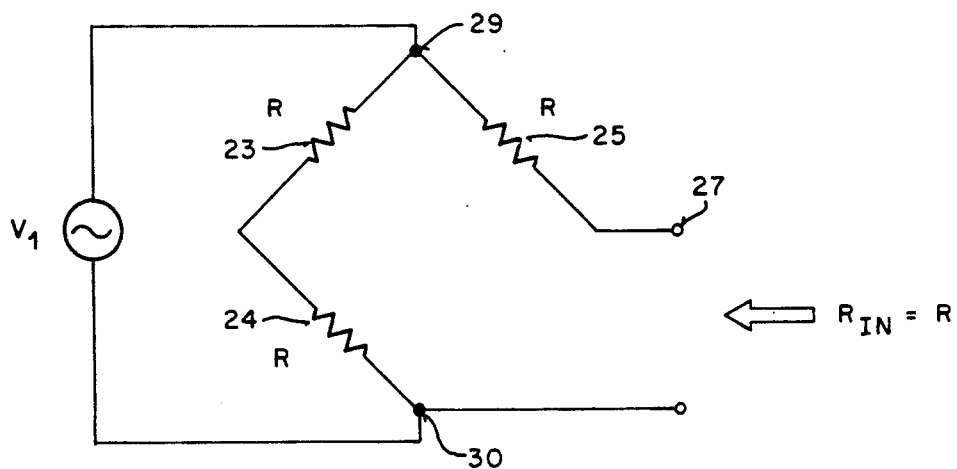
FIG_3C

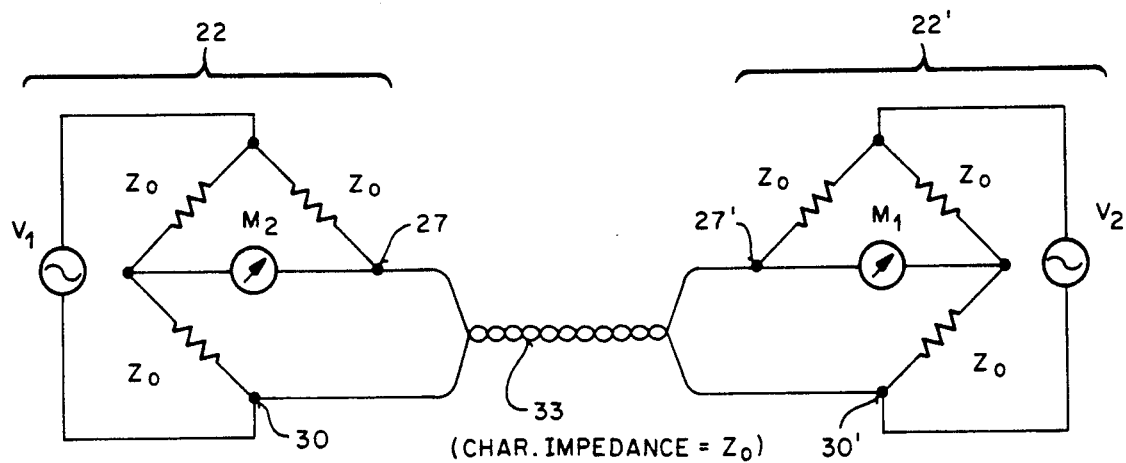
FIG_3D
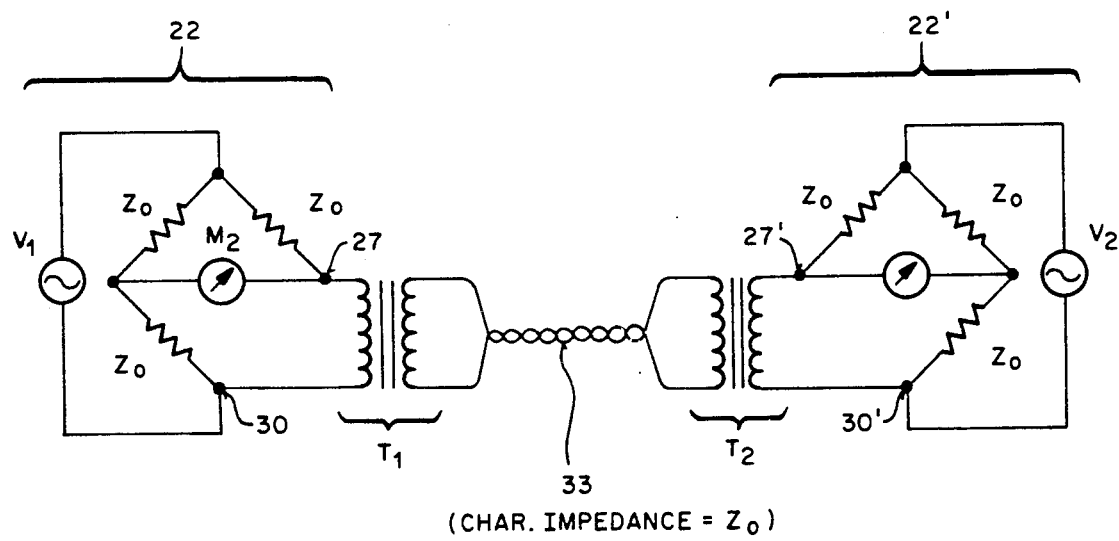
FIG_3E

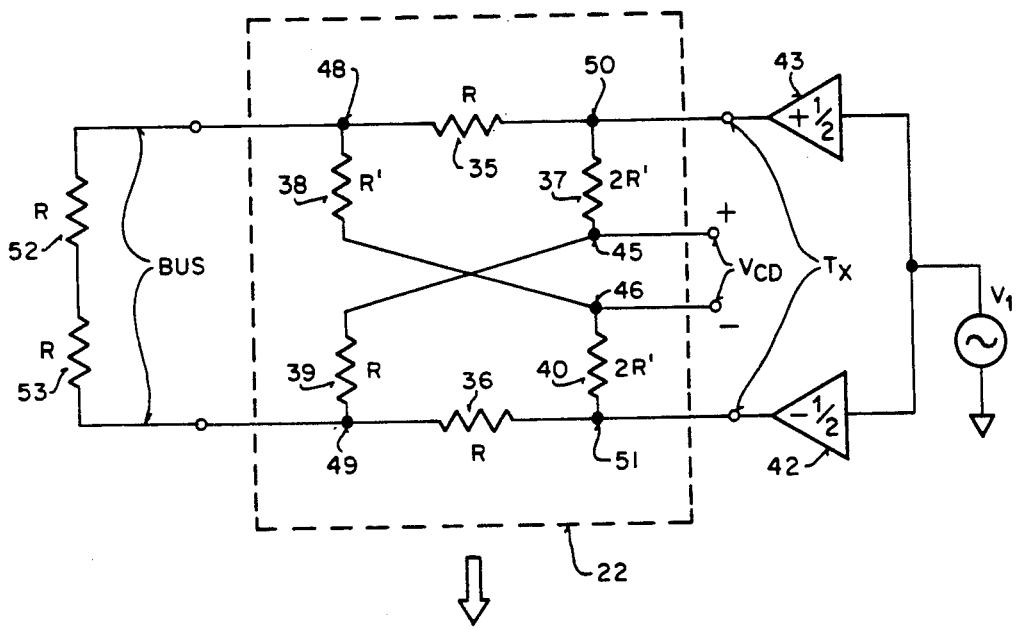
FIG _ 4A
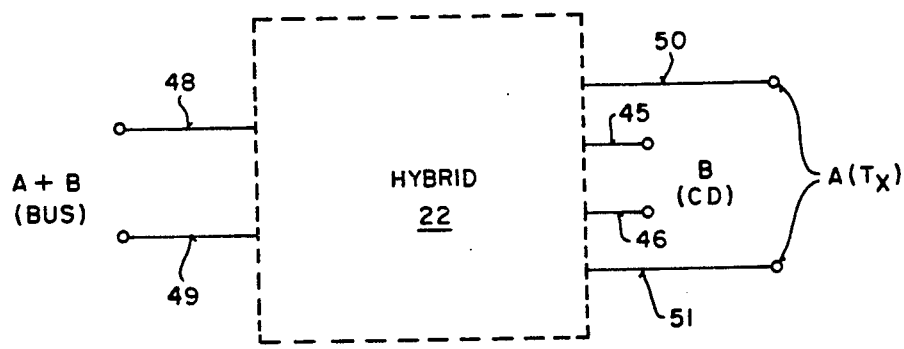
FIG _ 4B

FIG_5
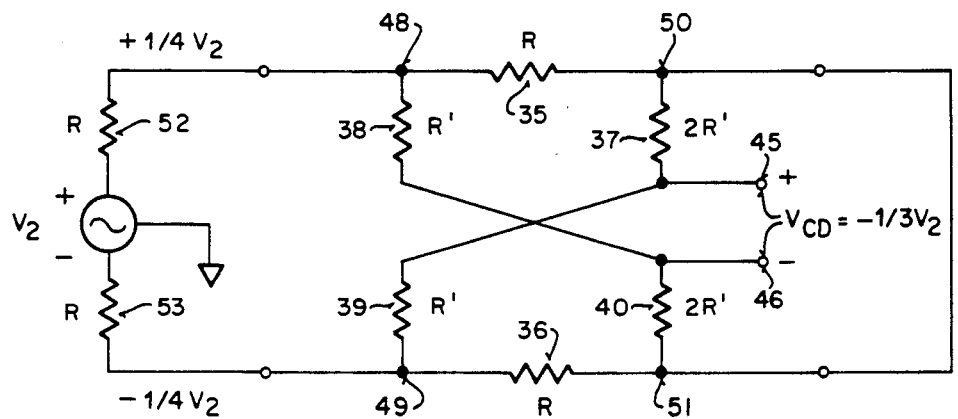
FIG_6
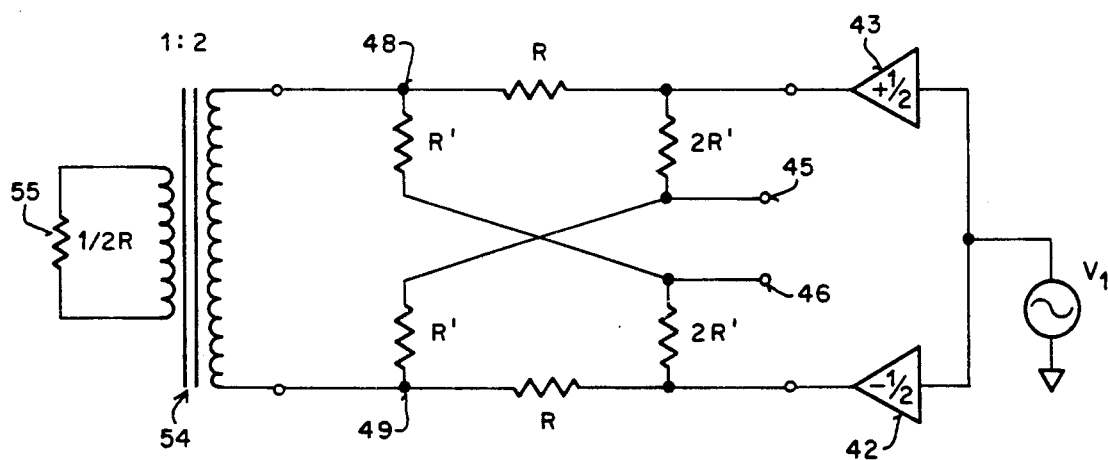

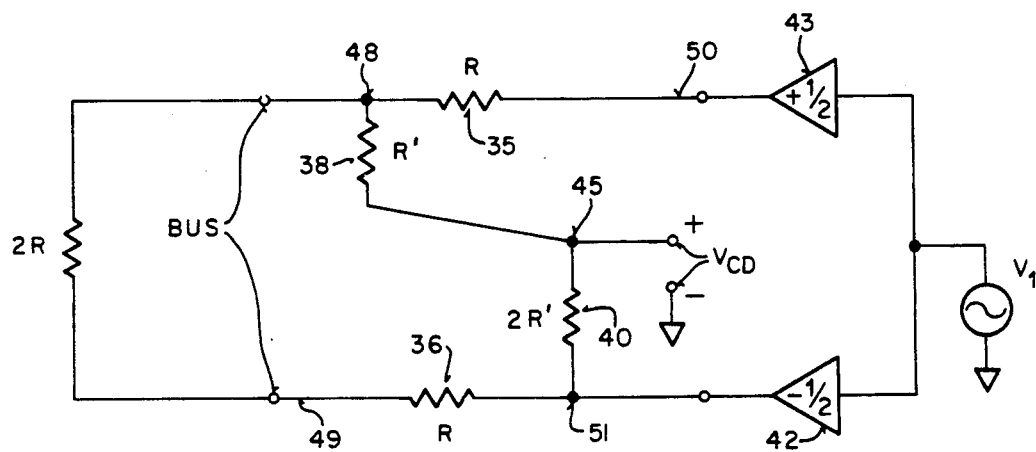
FIG_7
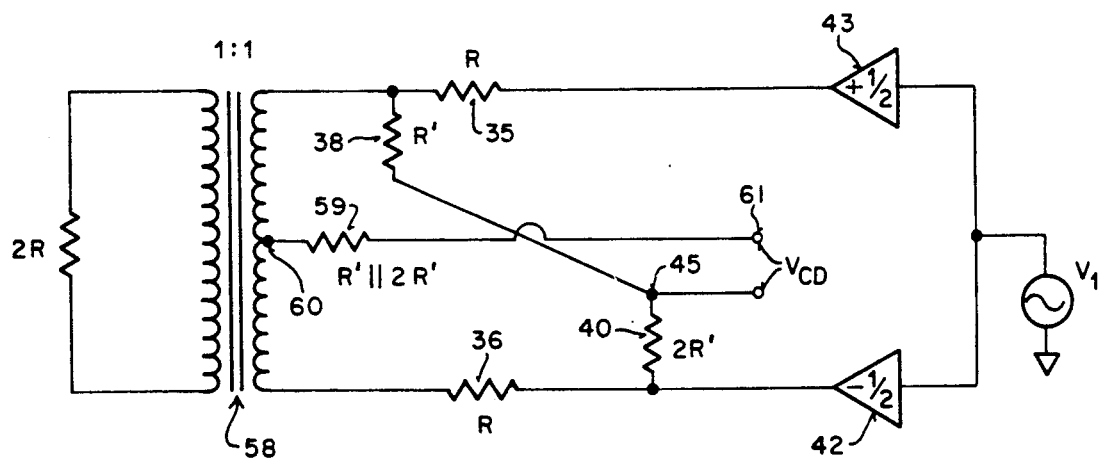
FIG_8

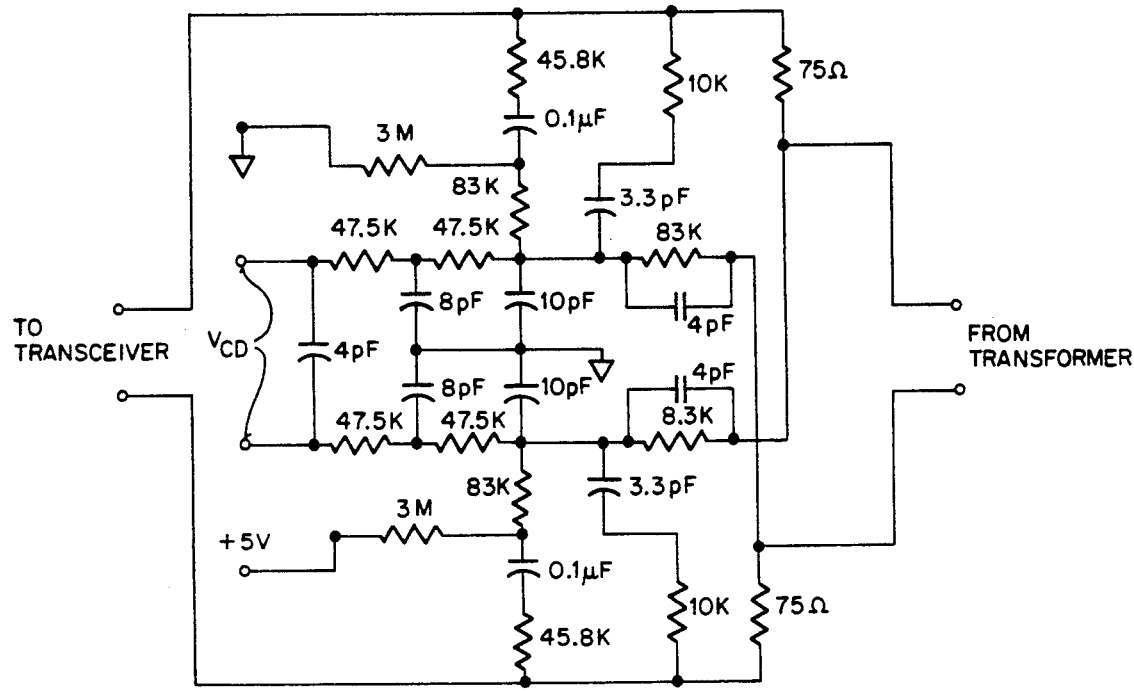
FIG_9
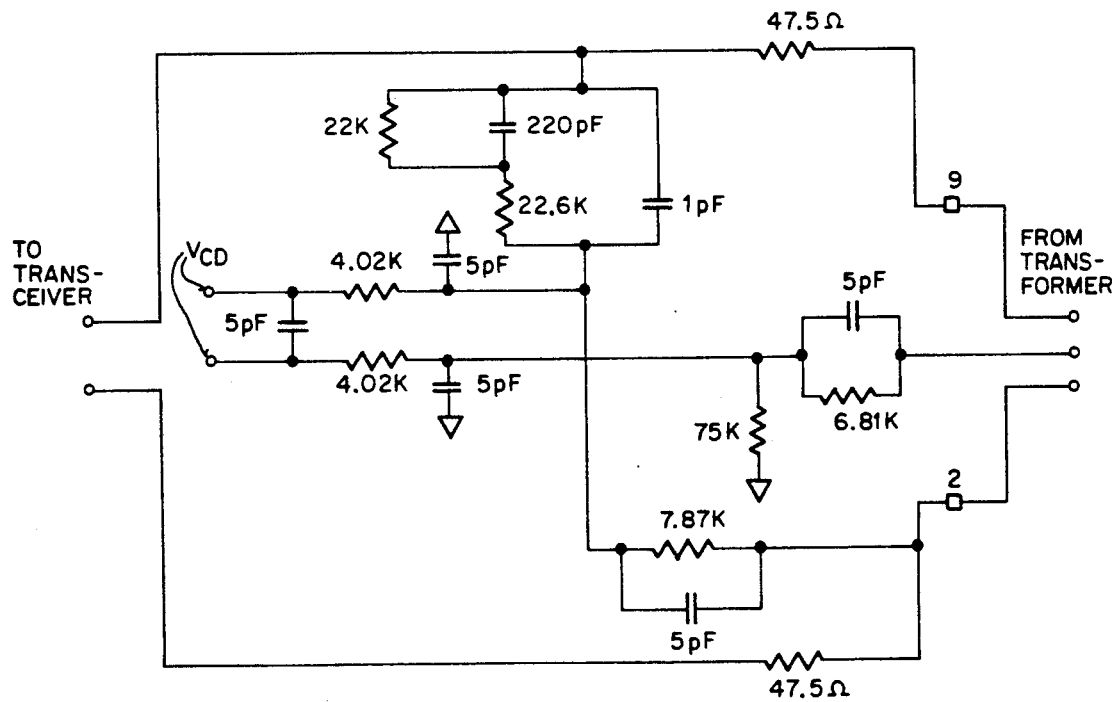
FIG_10

COLLISION DETECTION CIRCUIT FOR COMMUNICATIONS NETWORK

FIELD OF THE INVENTION

The present invention relates generally to data communication systems of the type wherein multiple processing nodes share access to the same network media. More particularly, the invention is related to circuits and methods for anticipating or handling collisions on such shared-access communications networks.

BACKGROUND OF THE INVENTION

Most data communications systems are configured to have a plurality of processing or communications nodes coupled to a common network media, such as a twisted pair cable. These processing nodes typically include cells which are responsible for controlling and/or communicating with other nodes or devices on the network. In any type of shared-access communication system, there is usually a requirement to have some sort of media access protocol which regulates communication along the network bus. There exists a number of well-known network communication protocols within the art.

In general, the alternative protocols for sharing a media among multiple communication processing nodes fall in four broad categories. One way involves utilizing pre-allocated time slots, with each processing node being assigned to a particular time slot. This technique is commonly referred to as time/division multiplexing. Basically, in a time/division multiplexed scheme when a processing nodes' allocated time slot arrives, that node is granted access to the network media. Even though this approach does benefit from a low hardware cost, its extremely poor response time and low bit rates make it a poor candidate whenever numerous processing nodes must be accommodated.

A token bus is another way that a media can be shared among multiple processing nodes. The token bus approach is deterministic in terms of how long it takes to acquire access to the common bus. However, the relatively high cost associated with the token bus hardware, and its relatively high power consumption, make this approach impractical in many cases. This is especially so in situations where each of the processing nodes is battery powered.

The token ring approach is also deterministic. However, this method requires the sort of media that allows message packets to be sent along the network in a "daisy-chain" fashion. That is, the media must be capable of accommodating communications between adjacent processing nodes only; wherein a transmission from one node can only be sent to an immediately neighboring node. This presents a strict limitation on the type of media that can be employed. Certain types of media are simply excluded. For example, when operating across a radio frequency (RF) media you cannot force a transceiver to send a message to only one receiver. This means that the token ring approach is incompatible for use with any sort of broadcast media.

A fourth class of commonly employed media protocols comprises the existing Carrier Sense Multiple Access (CSMA) family. This type of communication protocol has been established as a standard by Part 802 of the IEEE. Part 802.3 of the IEEE standards has also been adopted by ANSI, by the National Bureau of Standards, and by ISO (known by the name ISO 8802).

The existing CSMA family of protocols is well-known and widely-used within the art. The primary reason for its widespread adoption lies in its relatively low cost hardware. However, the main drawback of CSMA protocols is that collision rates tend to increase dramatically with the offered traffic. This usually leads to unpredictable delay at high loads. (Basically, a collision occurs when two processing nodes wish to send a message on the same network media at the same time. The signals collide or interfere, thereby destroying both message packets).

In an attempt to lessen the number of collisions as the communication traffic increases, various improvements have been made to the existing CSMA family of protocols. By way of example, in a co-pending U.S. patent application, which is assigned to the assignee of the present invention and is entitled, "Network Communication Protocol"; U.S. Ser. No. 07/621,737; filed Dec. 3, 1990; an improvement for avoiding data collisions on a network connecting to a plurality of communication nodes is disclosed. As additional background to the present invention, this co-pending application is herein incorporated by reference.

Despite these improvements, there still remains the problem of the relatively high-cost associated with collisions in terms of processing speed. When a collision occurs, the data in the message packet is irretrievably lost. However, the transmitting node is unable to recognize that a collision has occurred until after it has "timed-out"; that is, after it has waited for an acknowledgement signal from the receiving node and failed to receive it after a certain predetermined time period. Once the transmitting node realizes that a collision has occurred, then a higher layer in the protocol initiates a sequence of steps aimed at re-transmitting the same message. The end result is that even employing an improved protocol, such as the one detailed in the above-referenced application, collisions still cause significant communication and processing delays.

What is needed then is a way of further improving shared-access communications systems so as to further lower the collision rate with the offered traffic. Optimally, such a system would include some way of sensing—during the actual transmission—that a collision is occurring.

As will be seen, the present invention discloses a collision detection circuit which indicates, during the time that a node is transmitting, whether another message packet is being simultaneously transmitted across the network. By detecting message collisions in this manner the communications protocol can correct the situation (i.e., re-transmit) without the need to wait for a time-out condition to occur. Consequently, the response time of the network is even further improved over prior art methods when the collision detection circuit of the present invention is employed.

SUMMARY OF THE INVENTION

A collision detection circuit which indicates to a processing node, while the node is transmitting, that another transmission has or is occurring on the network, is described. The invented circuit is employed within a data communication system facilitating alternating current (AC) communications among a plurality of communication nodes distributed along a network. Because the network must accommodate communication among multiple nodes, the system utilizes some sort of shared-media access protocol.

In one embodiment, the invented circuit detects a collision on the network between first and second message packets sent by respective first and second transmitting nodes. The circuit comprises a means for directionally coupling the first node to the network. The coupling is such that the circuit discriminates between the outgoing power associated with the first message packet and the incoming power associated with the second message packet. A sensing means receives the incoming power from the directional coupling means during the transmission of the first message packet. The sensing means also provides an indication that a collision is occurring between the two transmissions.

The directional coupling means comprises a cross-coupled voltage divider network having a differential input port coupled to a first transmitting node, and a differential output port coupled to the network media (e.g., a twisted pair cable). The voltage divider network is configured such that a nulled voltage is generated at a pair of collision detection ports in response to the outgoing transmission or message packet, whereas a differential voltage is produced across the collision detection ports whenever an incoming transmission (i.e., the second message packet) appears on the network.

Detecting a collision in accordance with the present invention permits the processing node to begin re-transmission at an earlier point in time compared with prior art methods. Thus, the collision detection circuit of the present invention enhances the overall communication system's performance.

BRIEF DESCRIPTION OF THE DRAWINGS

The present invention will be understood more fully from the detailed description given below and from the accompanying drawings of the preferred embodiment of the invention, which, however, should not be taken to limit the invention to the specific embodiment but are for explanation and understanding only.

FIG. 1 is a simplified circuit diagram of a typical prior art shared-access network. The diagram of FIG. 1 also illustrates a collision occurring between message packets sent from two different transmitters to a single receiving node.

FIG. 2 is a simplified circuit diagram illustrating the basic concept of the present invention.

FIGS. 3A-3E collectively illustrate, in circuit diagram form, the operating principles and configuration of the collision detection circuit of the present invention.

FIG. 4A is a circuit schematic diagram of an alternative embodiment of the collision detection circuit of the present invention.

FIG. 4B shows a black box version of the circuit of FIG. 4A, illustrating how connection is made between the transmitter and the network bus.

FIG. 5 illustrates how a collision detection signal is generated utilizing the circuit of FIG. 4A.

FIG. 6 illustrates a circuit schematic diagram of an alternative embodiment of the present invention in which a transformer is employed.

FIG. 7 shows a circuit schematic diagram of yet another embodiment of the present invention.

FIG. 8 is a circuit schematic diagram of still another embodiment of the collision detection circuit of the present invention.

FIG. 9 is a detailed circuit diagram of the present invention as currently used for accommodating data rates of up to 78 Kbit/sec.

FIG. 10 is a detailed circuit diagram of the present invention as currently used for accommodating data rates of up to 1.25 Mbit/sec.

DETAILED DESCRIPTION

A collision detection circuit for use in a communications network is described. In the following description, numerous specific details are set forth in order to provide a thorough understanding of the invention. It will be obvious, however, to one skilled in the art that the present invention may be practiced without these specific details. In other instances, well-known circuits, structure and techniques have not been shown in detail in order to avoid unnecessarily obscuring the present invention.

FIG. 1 shows a typical prior art communication system without collision detection. A first transmitting node 12 transmits a message packet 17 onto a shared network bus 10. FIG. 1 shows the signal 17 propagating along bus 10 directed toward receiver 14. At the same time, or earlier to the transmission by node 12, a second node 11 may also have transmitted a signal 18 directed to the same receiver 14. The result is a data collision in which the message information is destroyed and must be retransmitted according to a certain system protocol.

FIG. 2 illustrates a simplified circuit diagram of the basic concept of the present invention. According to the present invention, each transmitting node is directionally coupled to the common network bus 20 through a device known as a "hybrid". Hybrid 22 permits a transmitting signal from the node to be passed onto bus 20. At the same time, hybrid 22 permits other messages present on bus 20 to be sensed at a collision detection port.

Ideally, none of the transmitting signal is coupled back to the collision detection port during transmission. That is, the function of hybrid 22 is to separate the outgoing and incoming power. For example, outgoing power associated with transmission signal $T_{X1}$ is shown being directly coupled to bus 20 during a transmission. During the same transmission, incoming power associated with transmission signal $T_{X2}$ is coupled to a collision detection port labelled $CD_1$.

The same situation occurs at the other processing node shown in FIG. 2. Transmission signal $T_{X2}$ is coupled to bus 20 while the transmission signal $T_{X1}$, present on bus 20, is coupled to port $C_{D2}$. Thus, in both cases hybrid 22 senses the power flow between the processing node and the network, and it is capable of discriminating between incoming and outgoing power. In this way, signal $T_{X2}$ appears at $C_{D1}$ (attenuated by the line attenuation) while $T_{X1}$ appears at $C_{D2}$ (also attenuated by the line attenuation). Note that the receive node Rx has not been shown in FIG. 2 to avoid possible confusion.

In accordance with the present invention, a processing node continuously monitors the CD signal while it is transmitting a message packet onto the network. When not transmitting, the node simply monitors its receive port. For example, in the standard CSMA protocol every node allowed to transmit if another processing node is sending message packets along the line. Once a node has attained access to the network bus, the node must begin to monitor its CD port to check for possible collisions. Hence, the invented detection circuit comprising hybrid 22 is useful whenever there are two or more signals (i.e., message packets) accidentally on the media at the same time. When this occurs, the incoming power ends up producing a signal at the collision detection port to indicate that a collision has occurred.

To better understand how hybrid 22 may be implemented in a circuit, first consider the bridge circuit of FIG. 3A. This bridge circuit comprises resistors 23-26, each having equal resistance value R. A voltage source $V_1$ drives the bridge across nodes 29 and 30. A voltmeter $M_2$ is coupled across intermediate nodes 27 and 28 to monitor the voltage across the bridge. As long as the values of resistors 23-26 are identical, $M_2$ will consistently read zero volts.

FIG. 3B shows the identical circuit of FIG. 3A, but with the voltage source $V_1$ turned off. For this situation, the equivalent impedance of $V_1$ is shown by a short circuit between nodes 29 and 30. Imagine next that in the leg of the bridge between nodes 27 and 30 that there was a voltage source $V_2$ which was previously turned off, and which now has been turned on. This is shown in FIG. 3B wherein voltage source $V_2$ is shown coupled in series with resistor 26 between nodes 27 and 30. For this case, nodes 28, 29 and 30 on the left hand side of the bridge all read the same potential (e.g., 0 volts). Resistors 25 and 26, however, act as a voltage divider such that meter $M_2$ reads $(\frac{1}{2})V_2$.

With reference now to FIG. 3C, one leg of the bridge between nodes 27 and 30 has been intentionally removed. Looking at the input impedance back into the open leg of the bridge network, the value of this impedance is simply R, since voltage source $V_1$ shorts the two left side resistors, (i.e., resistors 23 and 24). The Thevenin equivalent of the circuit of FIG. 3C can be simply drawn as a voltage source $V_1$ coupled in series with resistor 25 of value R.

In FIG. 3D the bridge circuits of previous FIGS. 3A-3C are shown coupled back-to-back. This configuration implements the hybrid function for a corresponding pair of nodes. Hybrid circuit 22 is shown comprising a bridge circuit of three equal impedances with one leg of the bridge between nodes 27 and 30 being intentionally left open. These two nodes are coupled to the respective lines of a twisted pair cable 33 having a characteristic impedance $Z_0$. Hybrid circuit 22 is shown being driven by voltage source $V_1$.

On the other side of the network, hybrid circuit 22' is driven by voltage source $V_2$. Hybrid 22' also contains a bridge circuit having three equal impedances $Z_0$ with one leg of the bridge between nodes 27' and 30' being coupled to the lines of twisted pair 33 connected to nodes 27 and 30, respectively.

As was demonstrated in conjunction with FIG. 3C, the input impedance looking back into each of the hybrids 22 and 22' from cable 33 is equal to $Z_0$. This means that each of the respective hybrid circuits terminates the open leg of the other bridge in a way that balances both of the bridges. This means that none of the voltage $V_1$ appears across voltmeter $M_2$, while one-half of $V_1$ appears across voltmeter $M_1$. Similarly, none of the voltage $V_2$ appears across voltmeter $M_1$, but one-half of $V_2$ does appear across voltmeter $M_2$. These operating principals are the same as those demonstrated in FIGS. 3A and 3B.

Thus, hybrid 22 allows voltage $V_1$ to be transmitted across twisted pair 33 while the incoming signal $V_2$ is sensed by voltmeter $M_2$. In other words, $M_2$ only senses the incoming transmission. Hybrid 22 functions as a directional coupler discriminating between the incoming power received in the form of $V_2$, and outgoing power as modelled by voltage source $V_1$.

Note that by utilizing a transmission line having a characteristic impedance equal to $Z_0$—which is itself terminated at both ends by an impedance which looks like $Z_0$—that signal reflections across the network are eliminated. The nodes themselves can be isolated by adding transformers $T_1$ and $T_2$ as shown in FIG. 3E. Use of transformers for this purpose is commonplace in many communications systems. It should be understood that if transformers $T_1$ and $T_2$ do not have a 1:1 turns ratio, then there may be a need for some compensation within the bridge to keep the bridges balanced. For this reason, each of the impedances of FIG. 3E is represented as having a value $aZ_0$, where $a$ represents a compensating factor.

FIG. 4A illustrates another embodiment of the collision detection circuit of the present invention. The hybrid network 22 of FIG. 4A comprises a pair of resistors 35 and 36 coupled across nodes 48, 50 and 49, 51, respectively. Resistors 35 and 36 both have resistance values R. Nodes 50 and 51 comprise the input ports to the network which receive the transmission signal $T_X$. In FIG. 4A, signal $T_X$ is generated by a single-ended voltage source $V_1$. The voltage source $V_1$ is transformed into a differential voltage by means of ordinary amplifiers 42 and 43. Amplifiers 42 and 43 split the transmission signal equally between nodes 50 and 51. In the currently preferred embodiment of the present invention, nodes 50 and 51 are driven by a differential CMOS high current driver pair.

At the other end of hybrid 22, nodes 48 and 49 function as output ports for hybrid 22. These nodes will be commonly coupled to the network bus which, for purposes of explanation, will be assumed to be a twisted pair cable. As will be described later, a relatively constant bus impedance is maintained by terminating each end of the bus in its characteristic impedance and by placing each transmitter into a high output impedance state while not transmitting. This bus impedance is represented in FIG. 4A by resistors 52 and 53.

The hybrid circuit of FIG. 4A includes a pair of cross-coupled voltage dividers. One of the voltage dividers comprises resistors 37 and 39, and the other is made up of resistors 38 and 40. Resistor 39, having a value R', is connected between nodes 49 and 45, while resistor 37 having a resistance value 2R' is coupled between nodes 45 and 50. Similarly, resistor 38 (value R') is coupled between nodes 48 and 46, while a resistor 40 (value 2R') is shown coupled between nodes 46 and 51. During operation, nodes 45 and 46 operate as collision detection ports. When an incoming message packet is detected by hybrid 22, a differential voltage $V_{CD}$ appears across nodes 45 and 46. This voltage can then be sensed by any one of a number of well-known circuits.

FIG. 4B depicts a "black-box" representation of the circuit of FIG. 4A. Hybrid 22 is shown having a differential input port represented by nodes 50 and 51, a differential output port shown by nodes 48 and 49, and a differential collision detection port represented by nodes 45 and 46. When in use, transmission signal "A" (generated by the transmitting node) is applied to hybrid 22 across nodes 50 and 51. If another message packet (e.g., signal "B") is present on the bus, a fraction of this latter signal is provided across collision detection ports 45 and 46. Ideally, none of the transmitting signal A appears across the collision detection nodes 45 and 46 during transmission.

To better understand the operation of the circuit of FIG. 4A, consider the case in which an input signal, $T_X$, is applied across nodes 50 and 51 from voltage source $V_1$. At the same time assume that no transmissions originating from any other processing node are present on the bus. For this situation, simple circuit analysis indicates that a voltage $+(\frac{1}{4})V_1$ will appear at node 48, and a corresponding voltage $-\frac{1}{4}V_1$ will appear at node 49 (assuming that resistance R' is much larger than resistance R). In this case a voltage $V_{CD}=0$ V is produced across nodes 45 and 46.

Another way of looking at the operation of the circuit of FIG. 4A is that each leg of the cross-coupled voltage divider network takes a weighted average of the voltages appearing at either of nodes 48 and 51, or 49 and 50. By making resistances 37 and 40 twice as large as respective resistors 39 and 38, a voltage null point is created at nodes 45 and 46 such that no transmitting signal appears. Thus, hybrid 22 rejects the outgoing transmission signal applied across nodes 50 and 51.

During a collision, the outputs of amplifiers 42 and 43 are in a low impedance state; effectively shorting nodes 51 and 50. This situation is illustrated in the circuit schematic diagram of FIG. 5. For this situation, the incoming transmission is represented by a voltage $V_2$ which is divided by resistors 52, 53 and 35, 36, such that voltage $+(\frac{1}{4})V_2$ and $-(\frac{1}{4})V_2$ appear across nodes 48 and 49, respectively. The cross-coupled voltage divider formed by resistors 38 and 40 produces a voltage $(1/6)V_2$ at node the voltage divider formed by resistors 37 and 39 yield a corresponding voltage $-(1/6)V_2$ at node 45. The magnitude of the differential voltage $V_{CD}$ resulting from the incoming signal is equal to $-(\frac{1}{3})V_2$. Hence, the cross-coupled divider network produces a voltage at collision detection ports 45 and 46 which represents a fraction of the incoming transmission voltage $V_2$.

It is appreciated that it is possible to achieve the hybrid function in the circuits of FIG. 4A and FIG. 5 using different combinations of resistor values. Different resistance values would simply alter the magnitude of the collision detection voltage $V_{CD}$. By way of example, hybrid circuit 22 would perform equally well if resistors 35 and 36 assumed values of 2R, resistors 38 and 39 had resistances equal to R', and resistors 37 and 40 had values equal to 3R'.

An important aspect of getting the collision detection circuit of the present invention to work properly is that the resistance or impedances employed within hybrid 22 need to be matched to the impedances of the twisted pair line or network bus. If the impedances of the wires were totally unknown, balancing the hybrid network to correctly discriminate between outgoing and incoming power would be difficult. Also, if the network has numerous receivers coupled to it, or if all of the processing nodes did not have very high input impedances, then the great number of parallel combinations of receiving nodes might imbalance the hybrid circuit resulting in a larger leakage signal between a given transmitter and its associated collision detection port.

Observe also that when the transmitting node switches to a high output impedance—as it does while in receive mode to avoid excessive bus loading—that the R' and 2R' resistance divider appears in parallel across the network bus. Thus, the input impedance of the node is reduced by the cross-coupled bridge network. From a practical standpoint, this means that higher values of the resistance R' must be chosen in order to accommodate a larger number of nodes and still avoid unbalancing all of the hybrids. This is due to large bus impedance variations between a few nodes connected, and many nodes connected to the bus.

It is also appreciated that the hybrid circuit illustrated in FIG. 3C could only be used with the above-described bus topology if resistors 23 and 24 are both increased in value.

FIG. 6 illustrates a circuit schematic diagram of an alternative embodiment of the present invention in which a transformer is added for the purpose of providing signal isolation, common mode rejection and impedance transformation. The diagram of FIG. 6 shows the basic cross-coupled network previously discussed in conjunction with FIGS. 4A and FIG. 5, but with output ports 48 and 49 being coupled to a transformer 54. Transformer 54 is shown having a winding ratio of 1:2 with the line side of the transformer being terminated in a resistor 55.

A practitioner skilled in the communications arts will understand that the non-ideal characteristics of transformer 54 will tend to "unbalance" the hybrid, thereby increasing the leakage signal from the transmit port to the collision detection port. The transformer characteristics which contribute to this effect include the transformers magnetizing inducatance, its leakage inductance, winding capacitance and winding resistance. Each of these transformer characteristics are compensated for by adjusting the resistance values shown in FIG. 6, and by adding a few capacitors. A detailed circuit diagram of the hybrid circuit of the present invention which includes these compensating elements is shown in FIG. 9. The circuit of FIG. 9 is capable of accommodating a data rate of 78K bits/sec.

In the circuit of FIG. 9, the 75, 83K ohm and 45.8K ohm resistors represented adjusted values which compensate for the winding resistance, as well as the desired output impedance of the hybrid's bus port. The 0.1 microfarad capacitors compensate for collective transformer magnetizing inductance. The 3.3 picofarad capacitors and 10K resistors, on the other hand, compensate for the transformers leakage inductance. The 47.5K ohm, 8 picofarad, 4 picofarad and 10 picofarad components constitute a lowpass filter for the collision detection port. This lowpass filter filters out high frequency noise and hybrid leakage which is above the frequency band of interest. The 3M ohm components introduce an offset which establishes a collision detection threshold above the level of leakage resulting from imperfections in hybrid balance.

If a number of hybrids are used in a bus topology (see FIG. 2) then the impedance value looking into the bus ports of each of the hybrids may be relatively low. For such a situation, the overall bus impedance might be adversely affected. Altering the bus impedance unbalances the hybrid circuits at each of the other nodes. This problem may be solved by placing the outputs in a high impedance state when not transmitting. (Note that in accordance with the currently preferred embodiment of the present invention, that the collision detection result is only monitored by a node while that node is transmitting—there being no need to observe it while in a receive node.)

To reduce the bus loading caused by the R' cross-coupled network, the alternative embodiment of FIG. 7 may be utilized. As can be seen, the circuit schematic diagram of FIG. 7 closely resembles that of earlier embodiments, however, one half of the network (one cross-coupled voltage divider) has been removed. This causes the loading of the bus to be reduced by a factor of 2. For the embodiment of FIG. 7, the collision detection voltage $V_{CD}$ appears only at node 45, which is referenced to an operating supply potential such as ground. Of course, the bus loading problem can be reduced even further by simply raising the R' values even higher (within practical limits).

One potential problem with the circuit of FIG. 7 is that it is sensitive to differential imbalance of the transmitter. That is, common mode components of the transmit signal appear at the $V_{CD}$ port 45 unattenuated. This was not a problem with the cross-coupled circuit embodiments previously discussed since the detection signal $V_{CD}$ was always produced differentially. Normally, the voltage $V_{CD}$ is sensed by an ordinary comparator or differential amplifier having very good common mode rejection. However, because the detection signal produced in FIG. 7 is single-ended, there may be a problem with common mode voltages.

These common mode problems can be solved by employing the circuit of FIG. 8. In the collision detection circuit of FIG. 8, the standard hybrid resistor network of earlier embodiments is shown being coupled through a transformer 58 to the network bus. The communications node side of transformer 58 includes a centertap 60 located at the middle of the secondary winding. A resistor 59 is shown being coupled from node 60 to a collision detection port 61. The value of this resistance is preferably selected to be equivalent to the parallel combination of R' and 2R'. The remainder of the circuit remains the same as was shown in FIG. 7.

The effect of including transformer 58 and associated resistor 59 is to transform the single-ended collision detection port of prior FIG. 7 into a differential port. Configured as a differential port, any common mode component of the transmit signal appears equally at both of nodes 45 and 61. This common mode component can then be readily rejected by the sensing amplifier or comparator used to detect the signal $V_{CD}$.

Resistor 59 connected to centertap 60 of transformer 58 sets the source impedance of both nodes 45 and 61 to be equal. This is required so that noise pick-up (and filtering) occurs equally at both collision detection nodes. If the source impedances were unequal, there would be a common mode-to-differential mode conversion which would increase the apparent leakage.

FIG. 10 is a detailed circuit schematic diagram of the hybrid of FIG. 8 as is currently used for accommodating data rates of up to 1.25 Mbits per second. In the circuit of FIG. 10, the 47.5 ohm components correspond to resistors 35 and 36 in the diagram of FIGS. 7 or 8. The 22.6K ohm components correspond to resistor 40, and the 7.87K ohm components correspond to resistor 38. Obviously, the values of these resistors have been adjusted to achieve a desired output impedance at the network bus port, as well as compensating for the winding resistance associated with the particular transformer used. These values have also been adjusted to maintain hybrid balance.

With continuing reference to FIG. 10, the 1 picofarad capacitors are included to compensate for transformer leakage inductance as well as stub inductance. The 220 picofarad and 22K ohm components compensate for the transformer magnetizing inductance, and the 6.81K ohm and 5 picofarad components approximate the common mode source impedance of the single cross of the hybrid bridge.

Furthermore, the 4.02K ohm and adjacent 5 picofarad capacitors constitute a lowpass filter to filter out high frequency noise and high frequency hybrid leakage signals. The 5 picofarad capacitors in parallel with the 7.87K ohm resistors compensate for average receiver capacitance on the bus. Finally, the 75K ohm resistors introduce an offset which sets the collision detection threshold above the level of leakage due to imperfections in hybrid balance.

What is claimed is:

1. In a data communication system facilitating communication among a plurality of nodes distributed along a common network, said common network employing a type of shared media access protocol, a circuit for detecting a collision on said common network between first and second message packets sent by respective first and second transmitting nodes, said circuit comprising:
   means for directionally coupling said first node to said common network, said coupling means discriminating between the outgoing power associated with said first message packet and the incoming power associated with said second message packet;
   sensing means for sensing a signal at a collision detection port of said directional coupling means during the transmission of said first message packet, said signal being produced by said incoming power and indicating that said collision is occurring.

2. the circuit of claim 1 wherein said directional coupling means comprises a passive network having first, second and third impedance elements, said first impedance element being coupled between one line of said common network and one terminal of said first transmitting node, said second impedance element being coupled between the other line of said twisted pair and the other terminal of said first transmitting node, said third impedance elements coupling said one line of said common network to said other terminal of said first transmitting node, and said fourth impedance element coupling said other line of said common network to said one terminal of said first transmitting node.

3. The circuit of claim 2 wherein said port is coupled to said third and fourth impedance elements.

4. The circuit of claim 2 wherein said third and fourth impedance elements each comprise a pair of resistors connected in series through first and second intermediate nodes, respectively, said first and second intermediate nodes comprising said port.

5. The circuit of claim 2 wherein one of said pair of resistors is approximately twice the value of the other of said pair.

6. The circuit of claim 2 wherein said first and second impedance elements each comprise a resistor having a relatively low resistance, and said third and fourth impedance elements comprise resistors having a relatively high resistance, such that said directional coupling means does not significantly load said network.

7. The circuit of claim 1 wherein said directional coupling means comprises a cross-coupled voltage divider network having a differential input port coupled to said first transmitting node, a differential output port coupled to said common network, each line of said input port being coupled to a corresponding line of said output port through a first resistance, and a pair of collision detection ports;

said voltage divider network being configured such that a null voltage is generated at said collision detection ports in response to said first massage packet, whereas a differential voltage is produced across said collision detection ports whenever said second message packet appears on said common network.

8. The circuit of claim 7 wherein each of said collision detection ports is coupled to one line of said input port through a second resistance, and cross-coupled to one line of said output port through a third resistance.

9. The circuit of claim 8 wherein said third resistance is significantly larger than said first resistance, and said second resistance is approximately twice as large as said third resistance.

10. the circuit of claim 8 wherein said common network is coupled to said output ports through a transformer.

11. In a data communication system facilitating communications among a plurality of nodes connected along a common bus, access to said bus being shared by said nodes in accordance with a certain protocol, a circuit for ascertaining that a collision is about to occur between a message packet transmitted onto said bus by a node and another message packet already present on said bus, said circuit comprising:

passive hybrid circuit means for differentially coupling said node to said bus such that incoming power associated with said another message packet produces a resultant signal at a detection port, while the outgoing power associated with said message packet produces a null response at said detection port; and means for monitoring said detection port while said node is transmitting, the presence of said detection port indicating that a collision is occurring.

12. The circuit of claim 11 wherein said passive hybrids circuit means comprises:

a first impedance coupled between a first line of said bus and a first line of said node, and between a second line of said bus and a second line of said node;

a second impedance coupled between said first line of said bus and said detection port;

a third impedance coupled between said detection port and said second line of said node.

13. the circuit of claim 12 wherein said second impedance is significantly larger than said first impedance, yet about one-half of the value of said third impedance.

14. The circuit of claim 13 wherein said passive hybrid circuit means is coupled to said bus through a transformer.

15. the circuit of claim 14 wherein the winding of said transformer connected to said passive hybrid circuit means includes a centertap, and said circuit further comprises a fourth impedance coupled between a reference port and said centertap, wherein common-mode components of said another message packet appear equally at said detection and reference ports.

16. the circuit of claim 14 wherein the value of said fourth impedance is approximately equivalent to the parallel combination of said second and third impedances.

17. The circuit of claim 6 wherein said common network comprises a twisted pair cable.

18. The circuit of claim 10 wherein said common network comprises a twisted pair cable.

19. The circuit of claim 1 wherein said directional coupling means comprises a voltage divider network having a differential input port coupled to said first transmitting node, a differential output port coupled to said common network, each line of said input port being coupled to a corresponding line of said output port through a first resistance, and said collision detection port, said voltage divider network being configured such that a null voltage is generated at said collision detection port in response to said first message packet, whereas a collision voltage is produced at said collision detection port whenever said second message packet is received.

20. The circuit of claim 19 wherein said collision detection port is coupled to one line of said input port through a second resistance, and to one line of said output port through a third resistance.

21. The circuit of claim 20 wherein said third resistance is larger than said first resistance and said second resistance is approximately twice as large as said third resistance.

22. The circuit of claim 21 wherein said common network comprises a twisted pair cable.

23. The circuit of claim 22 wherein said twisted pair cable is coupled to said differential output port through a transformer having a centertap, said centertap being coupled to said collision detection port such that collision voltage is differential in nature.

* * * * *

UNITED STATES PATENT AND TRADEMARK OFFICE
CERTIFICATE OF CORRECTION

PATENT NO. : 5,197,066

DATED : March 23, 1993

INVENTOR(S) : Philip H. Sutterlin

It is certified that error appears in the above-identified patent and that said Letters Patent is hereby corrected as shown below:

On the title page, item (73) Assignee, should read --Echelon Systems corporation, Palo Alto, CA --.

Signed and Sealed this

Eleventh Day of January, 1994

*Attest:*

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,197,066
DATED : March 23, 1993
INVENTOR(S) : Philip H. Sutterlin

It is certified that error appears in the above-indentified patent and that said Letters Patent is hereby corrected as shown below:

Column 7, line 3, after the word "node" insert 46, and--.
Column 11, claim 7, line 3, delete "massage" insert --message--.
Column 11, claim 38, after the word "said" insert --signal at said--.
Column 12, claim 13, line 1, delete "the" insert --The--.
    claim 15, line 7, delete the first occurrence "the" insert--The--.
    claim 16, line 14, delete the first occurrence "the insert--The--.

Signed and Sealed this

Twentieth Day of June, 1995

BRUCE LEHMAN

Attest:

*Attesting Officer*                *Commissioner of Patents and Trademarks*